Jan. 22, 1963 H. EBERT 3,074,296
INFINITELY ADJUSTABLE FLUID TRANSMISSION
Filed May 31, 1960 9 Sheets-Sheet 7

INVENTOR.
Heinrich Ebert
BY

Jan. 22, 1963    H. EBERT    3,074,296
INFINITELY ADJUSTABLE FLUID TRANSMISSION
Filed May 31, 1960                                        9 Sheets-Sheet 9
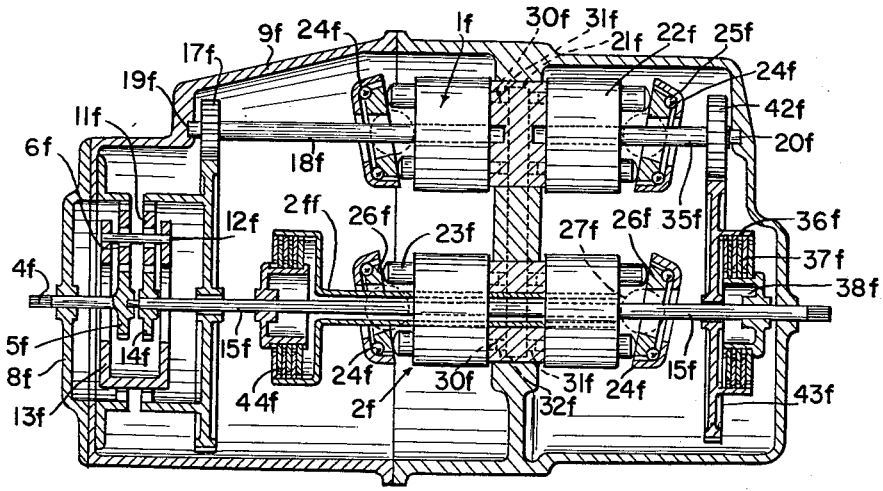
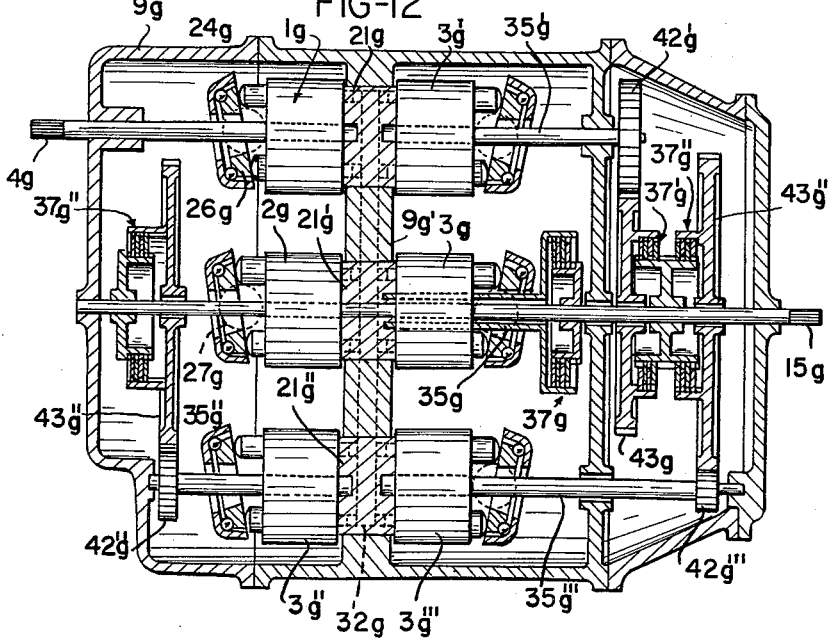
INVENTOR.
Heinrich Ebert
BY United States Patent Office 3,074,296
Patented Jan. 22, 1963

3,074,296
INFINITELY ADJUSTABLE FLUID TRANSMISSION
Heinrich Ebert, Im Weller 2, Furth, Bavaria, Germany
Filed May 31, 1960, Ser. No. 32,710
Claims priority, application Germany Aug. 29, 1957
7 Claims. (Cl. 74—687)

The present invention relates to an infinitely variable fluid transmission such as a hydrostatic transmission which, while not being limited to, is particularly useful in connection with heavy vehicles having a wide transmission stepdown range. Transmissions for such vehicles must permit stepdown ratios which at full power transmission are located between 1:1 (with a step-up transmission), and 1:16 (with self-propelled railroad cars), 1:11 with trucks and highway buses) or 1:6 (with city buses). Accordingly, with such transmissions, the output shaft has to furnish torques which will be sixteen times, eleven times, or six times the input torque. This application is a continuation-in-part application of my copending application Serial No. 748,709, filed July 15, 1958, now abandoned.

In order to obtain such high output torques, the motors of hydrostatic transmissions had heretofore to be greatly overdimensioned, regardless of whether the transmissions consist merely of a pump with a hydrostatic motor or whether they work in connection with a power dividing mechanical gear train. As a result thereof, the elements sliding upon each other, such as the sealing surfaces, pistons, cylinders, etc., become excessively large with regard to the power to be conveyed. This holds particularly true with transmission ratios which are rather small with regard to the maximum stepdown ratios, in view of the fact that in such an instance the speed of the output shaft actuated by the hydrostatic motors becomes relatively high, and also in view of the output torques which in such an instance are relatively low. Consequently, the degree of efficiency of such transmissions becomes worse the closer the transmission ratio of 1:1 is approached. Aside from the above, the maximum permissible speeds are limited with too big motors.

Therefore, it has been suggested with such transmissions, instead of one toog big a hydrostatic motor to employ two or a plurality of smaller hydrostatic motors and to drive the same by a pump and to cause said motors to act upon the output shaft. Such an arrangement has proved successful in reducing the size of the motors without being forced to keep the motor speed within strict limits. However, the said arrangement is not sufficient in order to reduce the above mentioned undesired high friction losses, particularly with high output speeds or low transmission ratio. Heretofore, in view of any better solution, it was necessary to put up with the said high friction losses.

It is, therefore, an object of the present invention to provide an infinitely variable hydraulic transmission, which will overcome all of the above mentioned drawbacks.

It is another object of this invention to provide an infinitely variable hydraulic transmission, which will have a wide transmission range and which will permit the shifting through said transmission range without interruption of power transmission.

These and other objects and advantages of the invention will appear more clearly from the following specification in connection with the accompanying drawings, in which.

Figure 1:
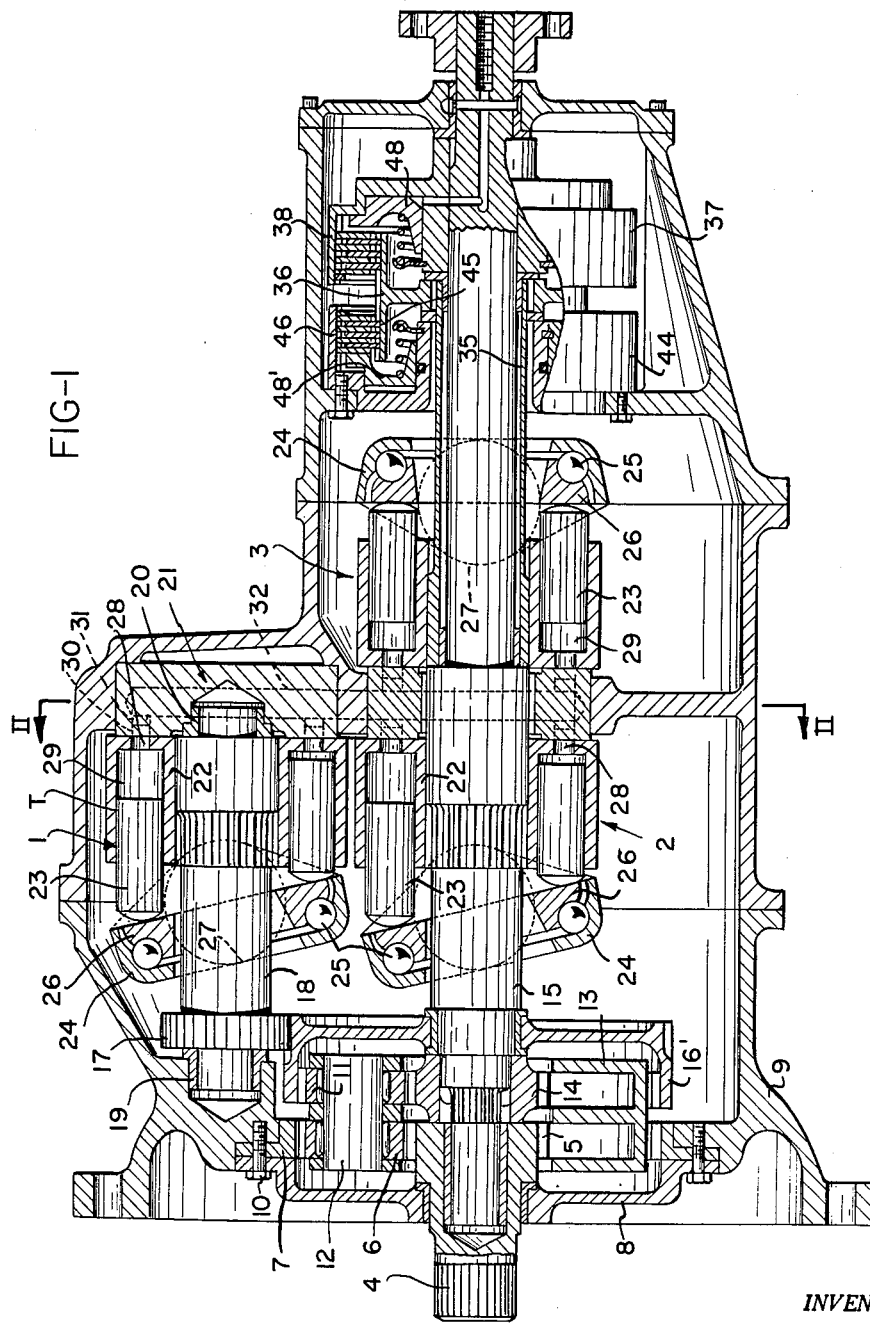
FIG. 1 represents a section through an axial piston transmission according to the present invention with a power dividing mechanical gear train and with a non-disconnectable motor and a disconnectable motor having the coupling means therefore coaxially arranged with regard to the output shaft and in direct cooperation therewith.
Figure 4:
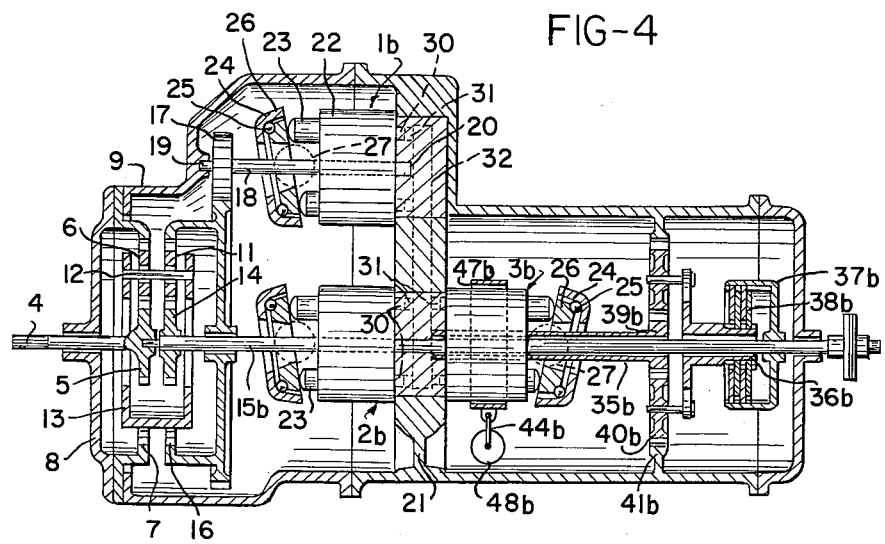

FIG. 4 diagrammatically illustrates a transmission similar to that of FIG. 1 but with the difference that a planetary gear transmission is arranged between the second motor and the coupling toward the output shaft.

Figure 5:
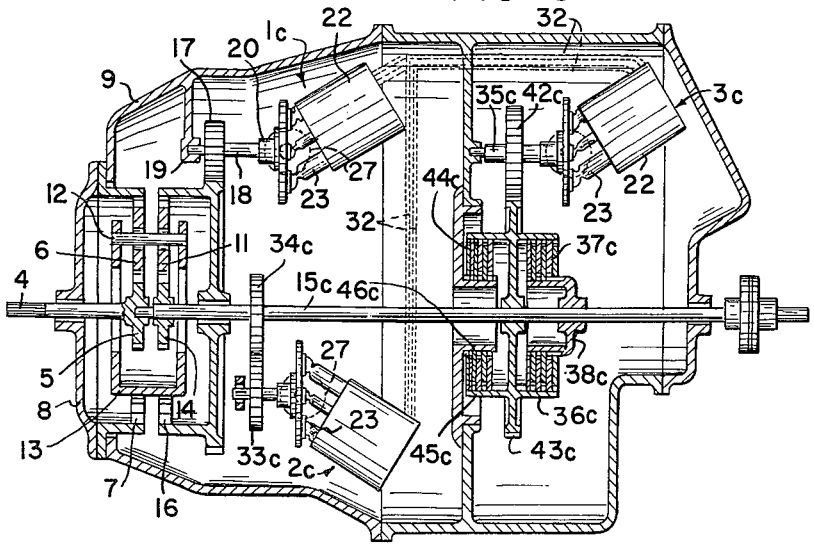

FIG. 5 diagrammatically illustrates a further modification according to which instead of axial piston units with tiltable swash plates axial piston units with tiltable drums are provided while the two motors act upon the ouput shaft with different transmission ratios.

Figure 6:
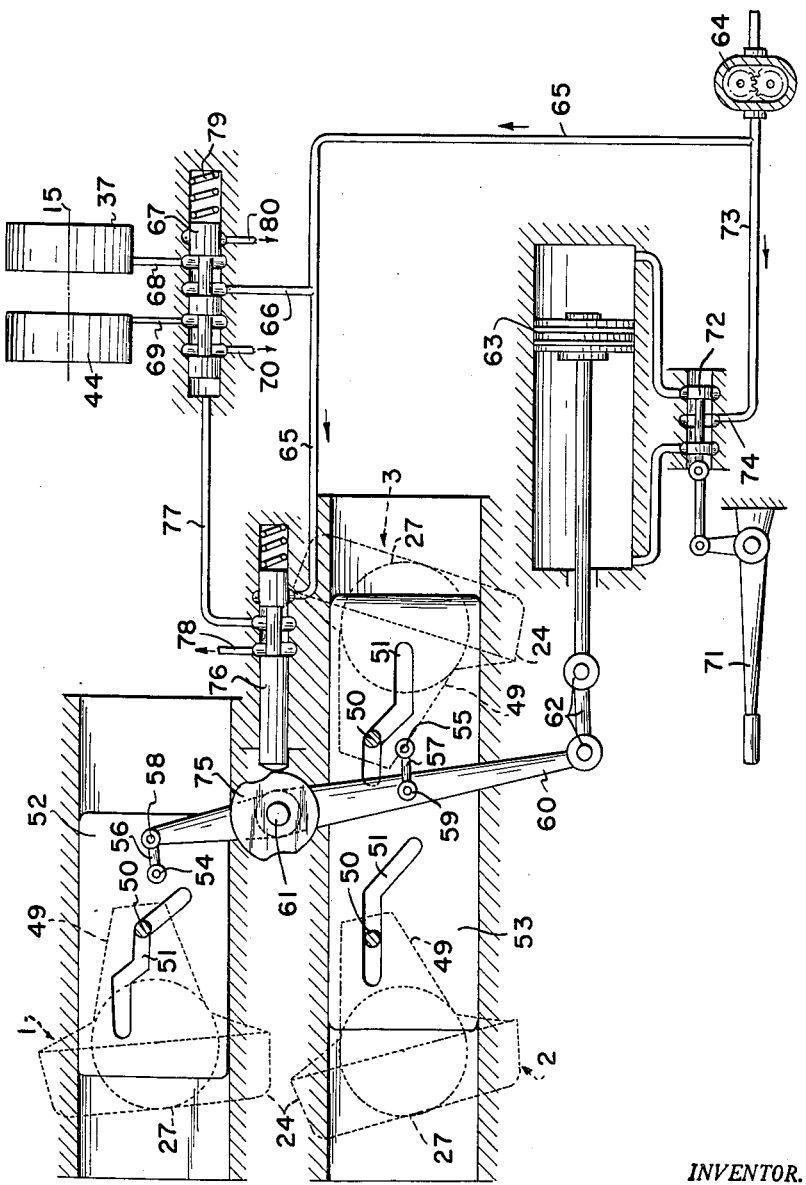

FIG. 6 represents a control device for the transmission according to FIG. 1.

Figure 7:
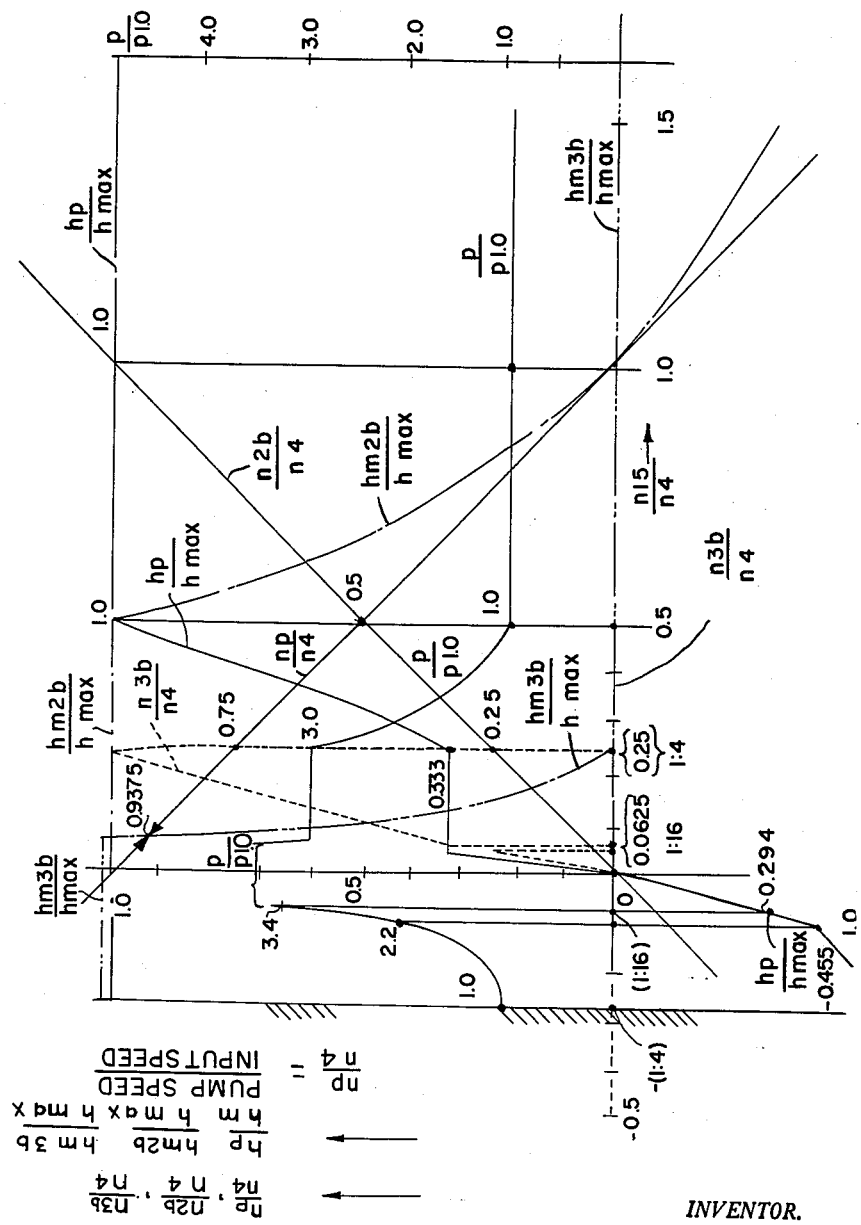

FIG. 7 shows a diagram with various curves illustrating the control of a transmission according to FIG. 4 in connection with other data.

Figure 8:
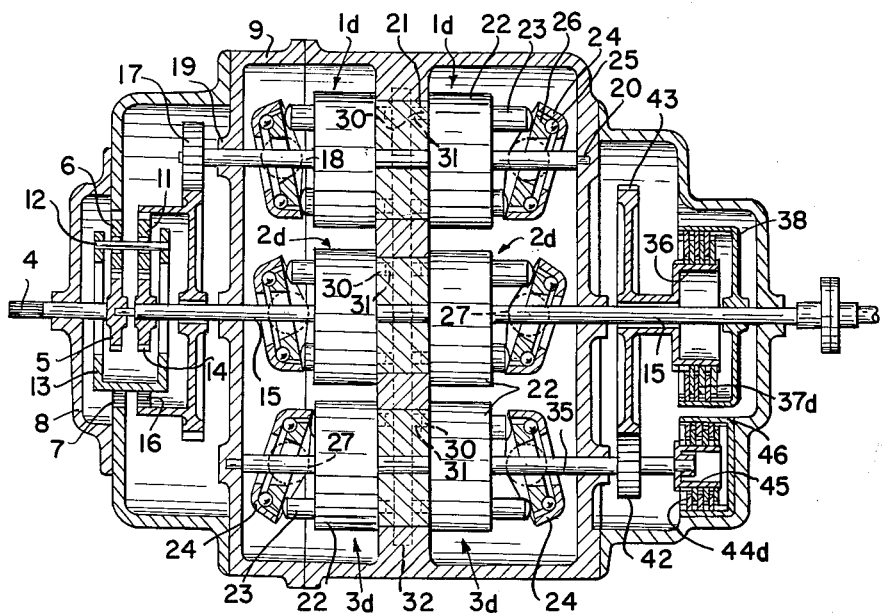

FIG. 8 is a diagrammatic illustration of a transmission in which the pump and two motors, one motor not being disconnectable and the other motor being disconnectable, are designed as double units and are arranged vertically with regard to each other.

Figure 9:
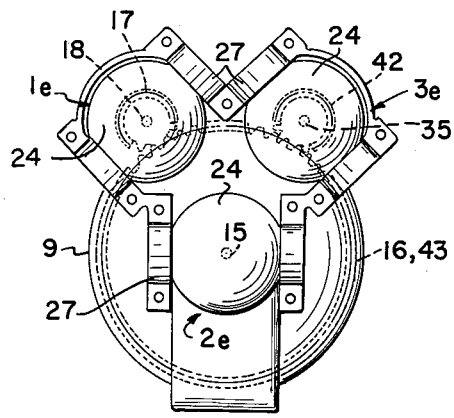

FIG. 9 is a diagrammatic illustration of a transmission similar to that of FIG. 8 but with the pumps and motors triangularly arranged with regard to each other.

Figure 10:
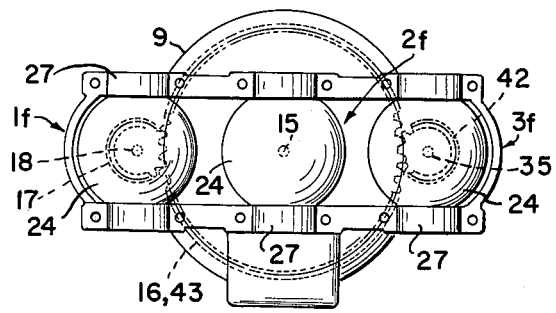

FIG. 10 is a transmission similar to that of FIG. 8 with pumps and motors horizontally arranged with regard to each other.

FIG. 11 shows partly in section a transmission with a power dividing mechanical gear train and with a double motor and a single motor, said motors selectively being disengageable and engageable.

FIG. 12 illustrate partly in section a transmission without power dividing mechanical gear train but with one pump and five motors, said motors with the exception of one selectively being engageable and disengageable.

*General Arrangement*

The infinitely variable hydraulic transmission according to the present invention is characterized primarily in that at least one motor of the motor unit is adapted to be disconnected from the output shaft. To this end, at least one disengageable or shiftable clutch or coupling is arranged between the said motor or motors on one hand and the output shaft on the other hand. The arrangement is such that the said clutch or coupling automatically separates the motor or motors from the output shaft when changing from stroke to "effective" stroke zero and vice versa when moving from the "effective" stroke zero to stroke. By effective stroke "zero" is meant that position of the motor swash plate or plates at which the output torque of the respective motor or motors is, for all practical purposes zero.

If a plurality of motors are provided which act in a parallel arrangement with regard to each other upon the output shaft common thereto, the transmission stepdown ratio is in this connection and in conformity with the present invention expediently changed by each time moving one motor prior to another motor from its maximum stroke to zero stroke so that one motor after the other will be disconnected from the output shaft, and vice versa, when changing the transmission ratio in the opposite direction, will again be connected. The shifting of the clutches or coupling members during the stroke zero makes it possible that in spite of the throwing in or taking out of the motors a continuous adjustment of the transmission will be assured throughout the entire transmission range in a jerk and shock-free manner and without interruption of the power flow.

In conformity with the present invention, each disconnectable motor or motor group may have associated therewith a brake representing coupling which, following the disconnection of the coupling from the output shaft, will brake and arrest the respective motors and will again release the respective motors with an inverse coupling operation.

When dealing with transmissions having a very wide stepdown transmission range, it is furthermore suggested in conformity with the present invention to provide different stepdown transmission ranges between the disconnectable motors or motor groups and the coupling or clutch cooperating with the output shaft so that at one and the same speed of the transmission output shaft it will be possible, when the clutch is engaged, to cause the motors to rotate at different speeds without respectively exceeding the maximum permissible speeds in view of the disconnecting operations. Thus, the individual motors can be exploited in a more economical way so that at the same pressure of the working fluid the torque will be further increased.

Structural Arrangement

The invention will now be described in detail in connection with some embodiments representing axial piston transmissions with a power dividing mechanical gear train through a double planetary gear transmission, each time with two motors or motor groups only (double piston motor), of which each time one motor only or one motor group only is adapted to be disconnected through the intervention of a disconnectable clutch and will work upon the output shaft, whereas the other motor or motor group will without an intermediate clutch act upon the output shaft common to the motors or motor groups. The disconnectable motor group is partly shown without additional stepdown transmission between the clutch or coupling member and the respective motors and is partly shown with an additional stepdown transmission according to the present invention. Transmissions in the illustrated form represent transmissions which are best suitable for the purpose involved.

Instead of one disconnectable motor only or one disconnectable motor group only, it is, of course, also possible to make also the non-disconnectable motors disconnectable. Similarly, further groups of disconnectable motors may be provided. The power division may also be effected through the intervention of a simple planetary gear transmission or through the intervention of a differential gear transmission.

It should also be noted that the invention may also be employed in connection with other transmission types for instance by employing radial piston units instead of axial piston units. The invention may also be used in connection with purely hydraulically operating transmissions working without power division.

In order to facilitate the identification of corresponding parts in the various embodiments shown in the drawings, all corresponding parts of the various embodiments have been designated with the same reference numeral but with a different affix in the various embodiments.

Figure 2:
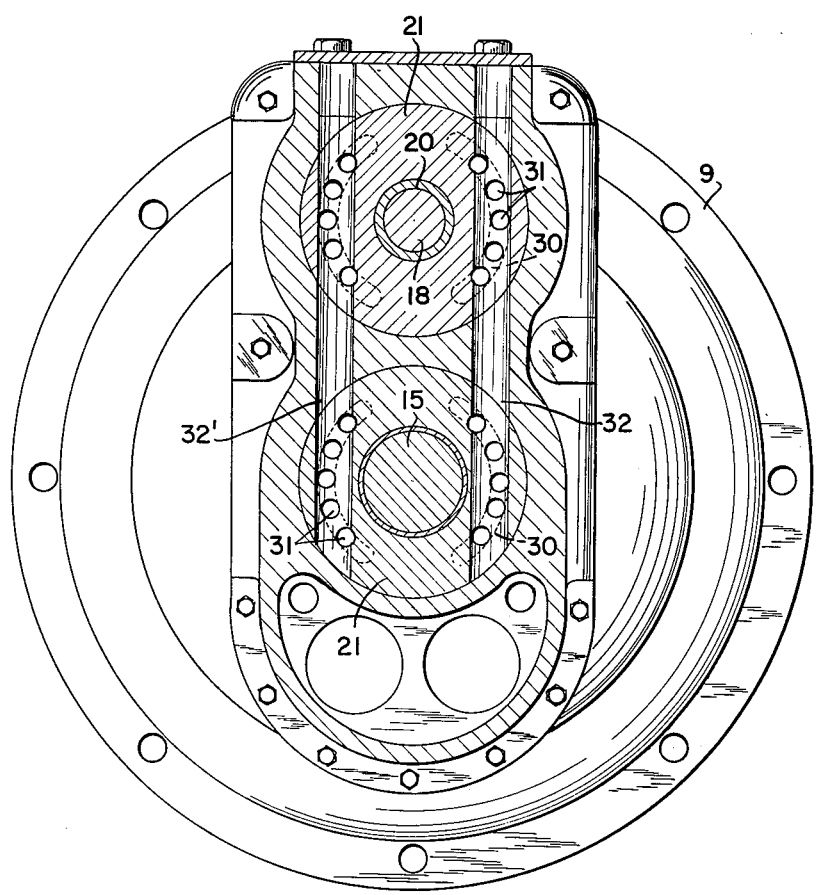
FIG. 2 represents a section taken along the line II—II of FIG. 1.

Referring now to the drawings in detail and FIG. 1 thereof in particular, the reference numeral 1 designates the pump unit, whereas the first motor is designated with the reference numeral 2 and the second motor is designated with the reference numeral 3. The drive is effected through the input shaft 4 the pinion 5 of which meshes with the planetary gears 6. The planetary gears 6 mesh with the inner gear ring 7 which together with the supporting and closing lid 8 is connected to the transmission housing 9 by means of screws 10. The planetary gears 6 and planetary gears 11 are rotatably journalled on pivots 12 (one only being shown) in a planetary gear carrier 13 common thereto. The gears 11 mesh with a sun wheel 14 keyed to an output shaft 15, and also mesh with the inner teeth of a gear ring 16 which latter is rotatably journalled on the output shaft 15. In addition thereto, the gear ring 16 is provided with outer teeth 16' meshing with a gear 17 of a pump driving shaft 18. Shaft 18 is rotatably journalled in bearings 19 and 20 in the transmission housing or in a control disc 21. Non-rotatably mounted on shaft 18 and driven thereby is a cylinder drum 22 of pump 1. The pistons 23 act upon a swash plate 26 which is rotatably journalled in a tiltable housing 24 by means of an anti-friction bearing 25. The housing 24 is by means of a pivot 27 indicated in dash lines tiltably journalled in the transmission housing 9. The cylinder drum 22 in customary manner has that side thereof which faces the control disc 21 provided with passages 28. Cylinder chambers 29 are through said passages 28 in hydraulic communication with control grooves 30 and control bores 31 and also in hydraulic communication with bores 32 (FIGS. 1 and 2) through the intervention of bores 31. The bores 32 serve as suction and pressure conduit means from the pumping unit 1 to the motor units 2 and 3. The motors 2 and 3 are, similar to the pump 1, designated as axial piston units. The motor pistons, similar to the pump pistons, act upon swash plates which, similar to the pump, are rotatably journalled in tiltable housings 24 by means of anti-friction bearings. Also the cylinder chambers of said motors communicate through corresponding passages in the cylinder drum as well as through control grooves and bores with the pressure bores 32 and suction bores 32' in such a manner that at a stroke different from zero they will in a parallel manner work upon the output shaft.

Motor 2 may act directly upon the output shaft 15 may be arranged coaxially therewith. Such arrangements are shown for instance in FIGS. 1, 3 and 4. However, as shown in FIG. 5, the motor 2c may also act upon the output shaft 15c through a gear transmission composed of gears 33c and 34c. Referring back to FIG. 1, motor 3 acts first upon a shaft 35 which may be coaxially arranged with regard to the output shaft 15 or may be merely axially parallel thereto, depending on the way in which shaft 35 acts upon clutch member 36 of a disconnectable clutch 37 arranged between motor 3 and the output shaft 15. The member 38 of clutch 37 is keyed to the output shaft 15 so that it will not be able to rotate relative thereto. The shaft 35 is adapted to act directly upon the clutch member 36 as shown in FIG. 1. However, in conformity with FIG. 4, the corresponding shaft 35b may act upon the clutch member 36b through a likewise coaxial planetary gear transmission comprising gears 39b, 40b and 41b. If desired, however, as shown in FIGS. 3 and 5, shaft 35a (FIG. 3) and shaft 35c (FIG. 5) may act upon the clutch member 36a and 36c respectively through the intervention of a stepdown transmission consisting of gears 42a, 43a (FIG. 3), 42c and 43c (FIG. 5).

In conformity with the present invention, the arrangement of FIG. 1 is additionally provided with a brake 44 which becomes active when the clutch 37 is disconnected. The brake 44 may, similar to the clutch 37, be designed in the manner of a disc clutch or merely as band brake. If the brake 44 is designed in the manner of a disc clutch, the member 45 thereof is directly connected to the output shaft of motor 3 as shown in FIG. 1. The members 45a (FIG. 3) and 45c (FIG. 5) are connected to the output shaft of motor 3a, 3c respectively by gears keyed thereto and through discs of conventional type may be held stationary with regard to the member 46, 46a, 46c screwed to the transmission housing.

Figure 3:
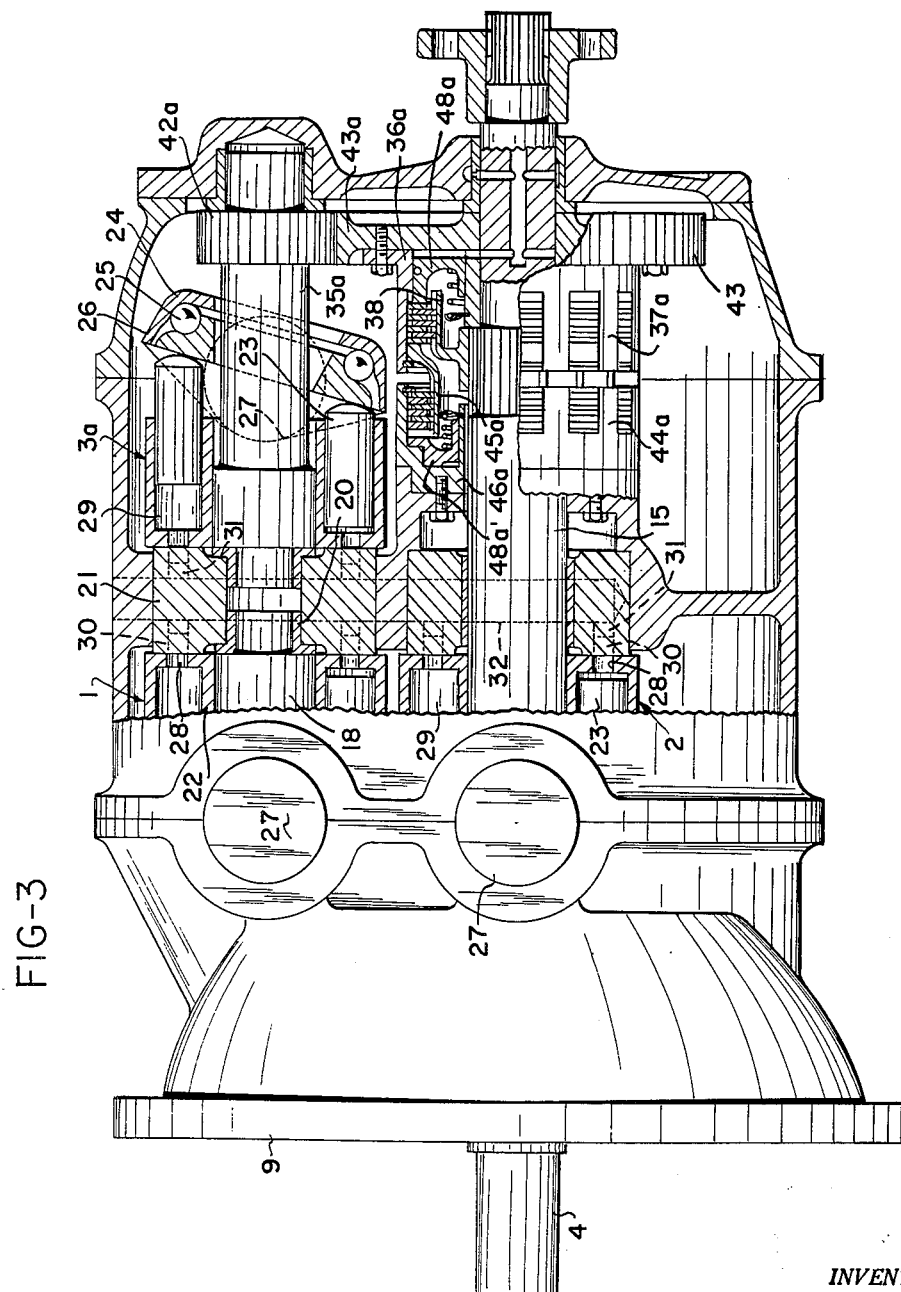
FIG. 3 illustrates a transmission somewhat similar to that of FIG. 1, but with the difference that the second motor acts upon the output shaft through the intervention of a gear transmission and is coaxially arranged with regard to the pump.

The arrangement shown in FIG. 3 is a slight modification over the transmission of FIG. 1 inasmuch as according to FIG. 3 the second motor 3a acts upon the output shaft 15 through the intervention of a gear transmission 42a, 43a as mentioned above, while the said second motor is coaxially arranged with regard to the pump 1. All other features of the arrangement in FIG. 3 correspond to those in FIG. 1 and, therefore, are designated with the same reference numerals as in FIG. 1 with the exception that corresponding but differently shaped members in FIG. 3 have additionally been provided with the affix "a."

According to the embodiment of FIG. 4, a brake band 47b is placed around the drum of the motor 3b and is fastened to the transmission housing. The brake band 47b may be actuated by a piston 48b indicated diagrammatically only. The pumps and motors may either in conformity with FIGS. 1, 3 and 4 be equipped with tiltable swash plates or in conformity with FIG. 5 may be equipped with tiltable drums, but, of course, also other constructions may be employed in connection with the present invention.

According to the modification illustrated in FIG. 5, the axial piston units with tiltable swash plates shown in FIGS. 1 to 4 have been replaced by axial piston units with tiltable drums 22 while the two motors 2c and 3c act upon the output shaft 15 with different transmission ratios. Otherwise, the arrangement of FIG. 5 is similar to that of FIG. 1 and corresponding parts have been designated either with the same reference numerals or in case of different design with the same reference numeral and the additional affix "c."

According to FIGS. 8 to 10, the pumps and motors may be designed as double units in such a manner that each time two piston drums operable independently of each other are arranged coaxially with each other and with the driving shaft therefor while being keyed or otherwise rotatably connected to their driving shafts so as to rotate therewith. The supply and discharge of oil is effected by double faced axial control members or discs between two drums associated with each other. Thus, for instance FIG. 8 shows such a transmission in which the pumps 1d and motors 2d and 3d are mounted in vertical arrangement, i.e. one above the other. FIG. 9 shows a transmission with the pumps 1e and motors 2e, 3e mounted in triangular arrangement. FIG. 10 shows a transmission according to the invention, in which the pumps 1f and motors 2f, 3f are mounted in a horizontal arrangement.

The type of transmission to be selected in each instance will depend primarily on the maximum desired stepdown ratio and on the available space for the installation of the transmission. The transmissions with double units as illustrated in FIGS. 8 to 10 are particularly well suited for employment in self-propelled railroad cars, locomotives and the like with which particularly wide stepdown ranges are required and which have to convey particularly high power, while on the other hand transmissions of relatively small dimensions are required.

The clutches 37, 37a and brakes 44, 44a are expediently actuated by the corresponding hydraulic pistons 48, 48a and 48', 48a' respectively and are illustrated in connection with FIGS. 1 and 3 only. The clutches and brakes shown in the other figures are actuated similarly, but for the sake of simplicity, the respective actuating pistons have not been shown. This actuation is preferably to be carried out in such a way that the brake 44, 44a, 44c and 44d are released when the clutches 37, 37a, 37c, 37d respectively are in their effective position and vice versa.

The shifting operation is, in conformity with the present invention, effected with the stroke zero of the second motor 3, 3a, 3b, 3c, 3d for instance in the manner illustrated in FIG. 6. FIG. 6 illustrates by dash lines the tiltable housing 24 for pump 1 and motors 2 and 3 for a transmission according to FIG. 1. The lever arms 49 carry pivots 50 which engage slots 51 of sliding blocks 52, 53 movable in longitudinal direction thereof. Each block 52 and 53 respectively has connected thereto a pivot 54 and 55 and by means of a link 56, 57 respectively is connected with a pivot 58 and 59 of a control lever 60 which is tiltably journalled on a pivot 61 carried by the transmission housing.

The adjustment of this control lever 60 is effected through the intervention of a crank and pivot 62 and a hydraulic piston 63 linked thereto. When adjusting said control lever 60 in clockwise direction, the upper sliding block 52 moves toward the right whereas the lower sliding block 53 moves toward the left and vice versa. The position of the tiltable housings as shown in FIG. 6 corresponds to the maximum stepdown ratio of the transmission in which both motors 2 and 3 act upon output shaft 15 with a maximum stroke, while the pump stroke is adjusted to approximately a third of the maximum stroke. As a result thereof, at a working fluid pressure which is approximately three times as high as it is with the stepdown ratio 1:1 a sevenfold torque of the input shaft is exerted upon the output shaft 15 and this at a transmission ratio of approximately 1:7 between output shaft 15 and input shaft 4. Due to the pressure produced by pump 64, piston 48 of clutch 37 is through the intervention of conduit 65, 66, the reversing valve spool 67 and conduit 68 maintained under pressure so that the discs between elements 36 and 38 are pressed against each other thereby coupling motor 3 to the output shaft 15. In contrast thereto, piston 48' of the brake 44 is by means of its spring lifted off the discs because piston 48' is, due to the lack of pressure in conduit 69, not acted upon by oil under pressure. Conduit 69 is in the particular position of the reversing slide or valve spool 67 shown in the drawing in communication with a conduit 70 leading toward the outside.

If due to the upward shifting of control lever 71 the valve spool 72 linked thereto is displaced toward the right, the oil delivered by pump 64 and passing through conduit 73 and 74 will displace the control piston 63 toward the left. The mechanism 54 to 62 will then move the sliding block 53 toward the left and the sliding block 52 toward the right. From the configuration of the slots 51 it will be obvious that first the stroke of motor 3 alone is adjusted to the stroke zero, whereas the stroke of motor 2 and the stroke of pump 1 retain the previously adjusted values. When the stroke position zero of motor 3 has been obtained, a cam 75 on control lever 60 has moved the valve spool 76 toward the right to such an extent that conduit 78 leading toward the outside is closed whereas conduit 77 communicates with conduit 65. The oil supplied by pump 64 then acts upon the end surface of the reversing valve spool 67 so that said valve spool is moved toward the right against the thrust of a spring 79 with the result that through conduit 69 the arresting coupling 44 will now be actuated. Due to the communication of conduit 68 with conduit 80 under no pressure, clutch 37 will be disengaged. As a result thereof, motor 3 is arrested in zero position. A further movement of the control piston in the direction toward the stepdown ratio 1:1 will cause the transmission to operate with one motor only, which means that the transmission ratio will then be determined by the stroke ratio only between the strokes of pump 1 and motors 2. During this operation, first the pump is adjusted to full stroke, whereas the motor first remains on full stroke. As a result thereof, the pressure of the working fluid drops. With further stepdown ratio toward 1:1, from the stepdown ratio 1:2 on, the full pump stroke remains, whereas now the stroke of motor 2 will be adjusted toward zero and eventually beyond a transmission ratio of 1:1 will reach even negative values. The pressure of the working fluid is proportional to the input torque and inversely proportional to the stroke of the pump. With constant even input shaft torque, therefore, with this embodiment of the invention, the pressure of the working fluid likewise remains constant from the stepdown ratio 1:2 on toward 1:1 and beyond the same in view of the pump stroke remaining the same during this operation.

With inverse actuation of the control lever 71, the control piston 63 will be displaced toward the right, and the entire above mentioned operation of the stroke adjustment of the clutch actuation will take its course in the inverse direction.

With a displacement of the control piston 63 toward the right beyond the position illustrated in the drawing, the complete stroke of the two motors 2 and 3 will be retained. However, the pump stroke will be brought to its complete negative value. If in this connection the stroke moves from a positive to a negative value, a transmission change from forward drive to rearward drive and vice versa will result. It is furthermore to be understood that each disengageable clutch has associated therewith a device of the type illustrated in FIG. 6.

With regard to the arrangement shown in FIG. 6, it is, of course, to be understood that the said arrangement may also be employed without the arresting means above referred to.

In order further to explain the present invention, FIG. 7 has plotted the stroke ratios of the individual hydraulic units of the transmission of FIG. 4 over the speed ratio $$\frac{n_{15}}{n_4}$$

$n_{15}$ indicating the output shaft speed, and $n_4$ indicating the input shaft speed. With the transmission according to FIG. 4, motor $3b$ acts upon the output shaft through a planetary gear transmission with a stepdown ratio between motor shaft and output shaft which may for instance be 1:4 so that motor $3b$ will operate at a fourfold output shaft speed.

In this instance, at full stroke of the two motors with a threefold pressure increase only of the working fluid over the pressure prevailing at the ratio 1:1, the sixteenfold input torque of a transmission ratio 1:1 may be exerted as will be evident from the following. One torque component is transmitted mechanically, three torque components will be obtained by motor $2b$, and $(4 \times 3)$=twelve torque components are furnished by motor $3b$ through the planetary gear transmission.

The stroke adjustments are evident from the diagram of FIG. 7 as will presently appear.

Between the stepdown ratios $$\frac{n_{15}}{n_4}=1:16 \text{ and } \frac{n_{15}}{n_4}=1:4$$

the stroke ratio $$\frac{h_p}{h_{max}}$$

for the pump will be approximately constant, namely 0.333, and the stroke ratio for motor $2b$ will be $$\frac{h_{m2b}}{h_{max}}=1.0$$

whereas the stroke ratio $$\frac{h_{m3b}}{h_{max}}$$

for motor $3b$ will change from 1.0 at the ratio of 1:16 to 0.0 at the ratio of 1:4. Within the same range, the pressure ratio $$\frac{p}{p_{1.0}}$$

will be 3.0 for the working fluid.

The speed of motor $3b$ will thus at a ratio of $$\frac{n_{15}}{n_4}=1:16$$

amount to $0.25n_4$ and will at a ratio of $$\frac{n_{15}}{n_4}=1:4$$

amount to $1.0n_4$.

The speed of motor $2b$ will at a ratio of $$\frac{n_{15}}{n_4}=1:16$$

amount to $$\frac{1}{16}n_4=0.0625n_4$$

and will at a ratio of $$\frac{n_{15}}{n_4}=1:4$$

amount to $0.25n_4$.

The speed of pump $1b$ will at a ratio of $$\frac{n_{15}}{n_4}=1:16$$

amount to $$\frac{15}{16}n_4=0.9375n_4$$

and will at a ratio of $$\frac{n_{15}}{n_4}=1:4$$

amount to $$\frac{3}{4}n_4=0.75n_4$$

Within the range of from 0.25 to 0.5 for the ratio $$\frac{n_{15}}{n_4}$$

the stroke ratio of $$\frac{h_p}{h_{max}}$$

for the pump will be adjusted from 0.333 to 1.0 whereby the pressure ratio drops from 3.0 to 1.0. In contrast thereto, the stroke ratio $$\frac{h_{m2b}}{h_{max}}$$

for motor $2b$ will remain at the constant value of 1.0, while the stroke ratio $$\frac{h_{m3b}}{h_{max}}$$

will remain at the constant value 0.0.

Within the same range, the speed ratio $$\frac{n_p}{n_4}$$

decreases from 0.75 at the ratio of $$\frac{n_{15}}{n_4}=0.25 \text{ to } \frac{n_p}{n_4}=0.5$$

at the ratio $$\frac{n_{15}}{n_4}=0.5$$

whereas the speed ratio $$\frac{n_{2b}}{n_4}$$

increases from 0.25 at the ratio $$\frac{n_{15}}{n_4}=0.25 \text{ to } \frac{n_{2b}}{n_4}=0.5$$

at the ratio of $$\frac{n_{15}}{n_4}=0.5$$

which means that it is proportional to $$\frac{n_{15}}{n_4}$$

whereas the motor $3b$ is at a standstill.

Within the range in which $$\frac{n_{15}}{n_4}$$

exceeds 0.5, the stroke ratio $$\frac{h_{m2b}}{h_{max}}$$

of the motor $2b$ is changed, namely from 1.0 at the ratio of $$\frac{n_{15}}{n_4} = 0.5 \text{ to } 0.0$$

at the ratio of $$\frac{n_{15}}{n_4} = 1.0$$

and finally is changed to negative values for a further increase of $$\frac{n_{15}}{n_4}$$

However, within this range, $$\frac{h_p}{h_{max}}$$

remains constant namely 1.0 whereas $$\frac{h_{m3b}}{h_{max}}$$

remains continuously 0.0.

The speed ratio of $$\frac{n_{2b}}{n_4}$$

increases proportionally to $$\frac{n_{15}}{n_4}$$

whereas $$\frac{n_p}{n_4}$$

drops from 1.0 at the ratio of $$\frac{n_{15}}{n_4} = 0.0 \text{ to } \frac{n_p}{n_4} = 0.0$$

at the ratio of $$\frac{n_{15}}{n_4} = 1.0$$

and will finally change to negative values via $$\frac{n_{15}}{n_4} > 1.0$$

while the speed ratio of $$\frac{n_{3b}}{n_4}$$

increases from 0.0 at the ratio of $$\frac{n_{15}}{n_4} = 0.0 \text{ to } \frac{n_{3b}}{n_4} = 1.0$$

at the ratio of $$\frac{n_{15}}{n_4} = 0.25$$

whereas for the entire remaining range, $$\frac{n_{3b}}{n_4}$$

remains 0.0.

Due to the constant pump stroke ratio $$\frac{h_p}{h_{max}} = 1.0$$

the pressure ratio of the working fluid $$\frac{p}{p_{1.0}}$$

will remain constant over the entire range from 0.5 upwards.

While within the range from 0.5 to 0.25

$$\frac{h_p}{h_{max}}$$

decreases from 1.0 to 0.333, the pressure ratio $$\frac{p}{p_{1.0}}$$

increases from 1.0 to 3.0. Within the range from 0.25 to 0.0625

$$\frac{p}{p_{1.0}}$$

remains constant = 3.0 because the pump stroke ratio $$\frac{h_p}{h_{max}}$$

remains constant.

For the sake of completeness, also the ratios for the rearward range may be mentioned, i.e. for the speed ratios of $$\frac{n_{15}}{n_4}$$

which are less than zero, which means are negative. For this range, constant maximum stroke of the two motors $2b$ and $3b$ prevails, while the pump stroke ratio $$\frac{h_p}{h_{max}}$$

has to become negative. More specifically, the following situations are obtained:

With a ratio of $$\frac{n_{15}}{n_4} = -(1:16), \frac{h_p}{h_{max}} = -0.294 \text{ and } \frac{p}{p_{1.0}} = 3.4$$

will be obtained.

With a ratio of $$\frac{n_{15}}{n_4} = -(1:10), \frac{h_p}{h_{max}} = -0.455 \text{ and } \frac{p}{p_{1.0}} = 2.2$$

will be obtained.

With a ratio of $$\frac{n_{15}}{n_4} = -(1:4), \frac{h_p}{h_{max}} = -1.0 \text{ and } \frac{p}{p_{1.0}} = 1.0$$

will be obtained.

As has already been mentioned above, the present invention in addition to making possible a reduction in the friction losses especially at low stepdown ratios, also, above all, makes possible a shift-over from one-motor operation to two-motor operation and vice versa without interrupting the power transmission so that a positive shock and jerk-free infinitely variable adjustment of the transmission will be made possible over the entire transmission range. Due to the possible arrangement and insertion of an additional greater transmission between the second motor and its clutch toward the output shaft, the second motor can be better exploited so that at the same increase in pressure, a considerably higher torque increase will be obtained. The above mentioned particular installation designs or arrangements yield particularly favorable solutions for vehicles with limited installation space.

Referring now to FIG. 11, this figure shows partly in section a transmission with a power dividing mechanical gear train, a double motor and a single motor, said motors being selectively disengageable and engageable. More specifically, motor 2f, which is in axial alignment with the output shaft 15f, is designed as double motor, which means it has two drums on a hollow shaft 2ff which is coaxial to the output shaft 15f. When the motors 2f and 22f are disengaged (transmission ratio 1:1) the entire power will be conveyed from the input shaft 4f to the output shaft 15f in a purely mechanical way through the double planetary gear transmission 5f, 6f, 11f, 14f.

The double motor 2f is adapted by means of clutch 44f, to be clutched directly to output shaft 15f without an intermediate gear transmission. The second motor 22f is coaxial with regard to pump 1f and is adapted to be clutched to the output shaft 15f through a gear transmission 42f, 43f with a transmission ratio 1:3 and a clutch 36f, 37f, and 38f.

The remaining parts of FIG. 11 and their functions correspond to those of FIG. 3, and, accordingly, all corresponding parts have been numbered with the same reference numerals as in FIG. 3 with the exception that the affix "a" has been replaced by the affix "f" and that other parts of FIG. 3 without affix have received the affix "f."

FIG. 12 represents a transmission without planetary gear transmission so that the power is conveyed from the input shaft 4g to the output shaft 15g always hydraulically only. The transmission of FIG. 12 consists of a pump 1g and five motors 2g, 3g, 3g', 3g", and 3g'". As will be evident from FIG. 12, the input shaft 4g is not coaxially arranged with regard to the output shaft 15g.

The drum of pump 1g is keyed to the input shaft 4g so as to rotate therewith. The drum of the first motor 2g is keyed to and non-declutchable from output shaft 15g so as always to rotate therewith. The drum of the second motor 3g is keyed to a hollow shaft 35g which is coaxially arranged with regard to output shaft 15g. Hollow shaft 35g is adapted to clutched directly, i.e. without intermediate transmission, to output shaft 15g namely through a shiftable clutch 37g. The drum of the third motor 3g' is arranged in axial alignment with the axis of pump 1g and is mounted on a rotatably journalled shaft 3g' in housing 9g. The right-hand end of shaft 35g' has keyed thereto a gear 42g' which latter meshes with a gear 43g' rotatably journalled on output shaft 15g. The said gear 43g' is adapted by means of clutch 37g' to be connected to output shaft 15g. The gear transmission stepdown ratio of said last mentioned gear transmission is 1:2 so that when gear 43g' is clutched to output shaft 15g, the drum of the third motor 3g' will rotate at twice the output speed. The drum of the fourth motor 3g" which is located according to FIG. 12 on the left-hand side thereof below the first motor 2g, is mounted on a shaft 35g" rotatably journalled on housing 9g. The left end of shaft 35g" has keyed thereto a gear 42g" meshing with a gear 43g" which is likewise rotatably journalled on output shaft 15g and is adapted to be connected to output shaft 15g by means of a clutch 37g". The stepdown ratio of input shaft speed to the speed of the fourth motor 3g" will amount to 1:4, which means that shaft 35g" of the fourth motor 3g" will in clutched condition rotate with four times the output speed.

Coaxially arranged with regard to the fourth motor 3g" is the drum of the fifth motor 3g'", said drum being keyed to a shaft 35g'" for rotation therewith. Shaft 35g'" is rotatably journalled in the housing 9g. The right-hand end of shaft 35g'" of the fifth motor 3g'" has keyed thereto a gear 42g'" which meshes with a gear 43g'" rotatably journalled on output shaft 15g. Gear 43g'" is adapted to be connected to output shaft 15g through a clutch 37g'". Shaft 35g'" of the fifth motor 3g'" has a transmission ratio with regard to output shaft 15g of 1:8 so that it will rotate with eight times the output speed.

Pump 1g, first motor 2g and fourth motor 3g" are arranged on the left-hand side, and second motor 3g, third motor 3g' and fifth motor 3g'" are arranged on the right-hand side of three double acting control discs 21g, 21g' and 21g". These three double acting control discs are mounted in a housing wall 9g' and have their suction and pressure sides respectively connected to each other by bores 32g which are provided in housing wall 9g' and also in control discs 21g, 21g' and 21g" in a manner similar to that as shown in section in FIG. 2 for the design of FIG. 1.

The pistons pertaining to the various drums in the arrangement of FIG. 12 act upon correspondingly arranged swash plates 26g associated with the respective drums and rotatable in tiltable housings 24g which in their turn can be tilted about studs 27g fixedly arranged in the housing 9g. It will thus be evident that the stroke of the pump as well as of the motors may be varied.

When all hydraulic units are adjusted for full stroke and all motors are engaged by the clutches pertaining thereto, the torque acting upon the output shaft 15g will equal sixteen times the torque of the input shaft 4g.

When the pump stroke is reduced, which means that the pressure of the working fluid is increased, the torque of the output shaft can still be further increased.

With the same negative piston stroke of pump 1g—negative tilting angle of swash plate—the same torque can be obtained for the rearward drive range as can be obtained for the forward drive range at the same pressure of the working fluid.

If all de-clutchable motors are adjusted one after another to zero stroke, and if each motor when adjusted for zero stroke is disengaged or de-clutched from the output shaft, the input power will be conveyed from the pump through the first motor 2g to the output shaft 15g—transmission ratio 1:1—with forwardly as well as with rearwardly driving output shaft depending on whether the pump is on positive or negative stroke. This range can even be broadened to an overdrive range when reducing the piston stroke of the first motor with regard to the piston stroke of the pump.

It will be obvious from the above that with the arrangement of FIG. 12, the pressure of the working fluid can be held constant up to the sixteenfold torque in forward as well as in rearward direction.

It is, of course, to be understood that the present invention is, by no means, limited to the particular constructions shown in the drawings but also comprises any modifications within the scope of the appended claims.

What I claim is:

1. In an infinitely variable fluid transmission having an input shaft and an output shaft, hydraulic pump means drivingly connected to said input shaft, hydraulic motor means of variable displacement hydraulically connected to said pump means and operable thereby, adjusting means operatively connected to said motor means for selectively varying the displacement thereof to thereby adjust the displacement of said motor means selectively to the displacement zero whereby said motor means will exert no torque, clutch means for selectively establishing and interrupting driving connection between said motor means and said output shaft, and means operatively connected to said adjusting means and operable after an adjustment of said motor means has been effected from effective displacement to zero displacement to interrupt driving connection between said motor means and said output shaft and also operable in response to an adjustment of said adjusting means in the direction toward an effective displacement but prior to the adjustment from zero displacement to an effective displacement to establish driving connection between said motor means and said output shaft.

2. In an infinitely variable fluid transmission having an input shaft and an output shaft, hydraulic pump means drivingly connected to said input shaft, a plurality of hydraulic motor units of variable displacement hydraulically connected to said pump means and operable thereby, a plurality of control means independent of each other and respectively operatively connected to said motor units for selectively varying the displacement thereof to thereby adjust the displacement of the respective motor units selectively to the displacement zero whereby each of said motor units independently of the others may exert no torque, a plurality of clutch means, each of said motor units being adapted selectively by one of said clutch means to be connected with or disconnected from said output shaft, and a plurality of means respectively operatively connected to said control means and responsive to an adjustment of the respective motor unit from effective displacement to zero displacement and vice versa to respectively disengage and engage the clutch means pertaining to the respective motor unit whereby the driving connection of the latter with said output shaft is interrupted and reestablished respectively.

3. A transmission according to claim 2, in which at least one of said motor units includes two motors.

4. In an infinitely variable fluid transmission having an input shaft and an output shaft, hydraulic pump means drivingly connected to said input shaft, two hydraulic motor units of variable displacement hydraulically connected to said pump means and operable thereby, control means operatively connected to said two motor units for selectively and simultaneously varying the displacement of said two motor units to thereby adjust the displacement of said two motor units selectively to the displacement zero whereby said two motor units will exert no torque, a single clutch interposed between said two motor units and said output shaft, and means operatively connected to said control means and responsive to an adjustment of said motor units from effective displacement to zero displacement and vice versa for respectively interrupting and establishing driving connection between said motor units and said output shaft.

5. An infinitely variable fluid transmission according to claim 1, which includes brake means operatively connected to said clutch means and effective in response to a disengagement of said clutch means and vice versa to respectively brake and release said motor means when the latter is disconnected from and connected to said output shaft respectively.

6. In an infinitely variable fluid transmission having an input shaft and an output shaft, hydraulic pump means drivingly connected to said input shaft, hydraulic motor means of variable displacement hydraulically connected to said pump means and operable thereby, adjusting means operatively connected to said motor means for selectively varying the displacement thereof to thereby adjust the displacement of said motor means selectively to the displacement zero whereby said motor means will exert no torque, transmission means interposed between said motor means and said output shaft, clutch means for selectively establishing and interrupting driving connection between said motor means and said output shaft through said transmission means, and means operatively connected to said adjusting means and operable after an adjustment of said motor means has been effected from effective displacement to zero displacement to interrupt driving connection between said motor means and said output shaft and also operable in response to an adjustment of said adjusting means in the direction toward an effective displacement but prior to the adjustment from zero displacement to an effective displacement to establish driving connection between said motor means and said output shaft through said transmission means.

7. An infinitely variable fluid transmission according to claim 6, in which said motor means includes a plurality of motors, and in which said transmission means includes a plurality of transmissions of different transmission ratio, said clutch means including a plurality of clutches respectively pertaining to said motors and the transmission means pertaining thereto.

References Cited in the file of this patent

UNITED STATES PATENTS

| | | |
|---|---|---|
| 2,344,335 | Wahlmark | Mar. 14, 1944 |
| 2,549,989 | Simonds | Apr. 24, 1951 |
| 2,562,363 | Nixon | July 31, 1951 |
| 2,808,737 | Bullard | Oct. 8, 1957 |
| 2,931,250 | Ebert | Apr. 5, 1960 |